(12) United States Patent
Spasovski

(10) Patent No.: US 6,539,841 B1
(45) Date of Patent: Apr. 1, 2003

(54) DEVICE FOR AUTOMATICALLY PREPARING FOOD

(76) Inventor: Marjan Spasovski, Ruhrallee 228, 45136 Essen (DE), 45136

(*) Notice: Subject to any disclaimer, the term of this patent is extended or adjusted under 35 U.S.C. 154(b) by 0 days.

(21) Appl. No.: 09/958,590

(22) PCT Filed: Apr. 12, 2000

(86) PCT No.: PCT/EP00/03255

§ 371 (c)(1), (2), (4) Date: Oct. 10, 2001

(87) PCT Pub. No.: WO00/62655

PCT Pub. Date: Oct. 26, 2000

(30) Foreign Application Priority Data

Apr. 14, 1999 (DE) .......................... 199 16 862
Apr. 14, 1999 (DE) .......................... 199 16 904
Apr. 14, 1999 (DE) .......................... 199 16 863

(51) Int. Cl.[7] .................. A47J 37/12; A47J 27/00
(52) U.S. Cl. .............. 99/334; 99/339; 99/348; 99/407; 426/115; 426/120
(58) Field of Search .............. 99/334, 339, 340, 99/348, 357, 407; 222/501, 168, 168.5, 160, 505; 221/293, 298; 426/120, 112, 115, 79

(56) References Cited

U.S. PATENT DOCUMENTS

| | | | | |
|---|---|---|---|---|
| 3,394,869 A | * | 7/1968 | Fontana et al. | 426/120 |
| 3,448,677 A | | 6/1969 | Dexters | 99/336 |
| 4,762,056 A | | 8/1988 | Virag | 99/345 |
| 5,073,393 A | | 12/1991 | Defrancisci | 426/508 |
| 5,537,915 A | | 7/1996 | Kelly | 99/336 |
| 5,819,636 A | * | 10/1998 | Khashoggi | 99/348 X |
| 5,925,390 A | * | 7/1999 | Kornacki | 426/120 X |
| 6,032,571 A | * | 3/2000 | Brous et al. | 99/348 X |

FOREIGN PATENT DOCUMENTS

EP          0 313 037          4/1989

* cited by examiner

Primary Examiner—Reginald L. Alexander
(74) Attorney, Agent, or Firm—Ohlandt, Greeley, Ruggiero & Perle, L.L.P.

(57) ABSTRACT

A device for automatically preparing food is provided. The device includes a hot plate for heating a pot. Above the hot plate, a chamber is arranged. In the chamber, an exchangeable cartridge is provided which contains ingredients for the preparation of the food. The cartridge comprises an opening for filling the ingredients into the pot. The opening of the cartridge is closed with a closure, preferably a foil. The closure of the cartridge can be opened by a drive unit provided at the chamber.

17 Claims, 12 Drawing Sheets

Figure 1:
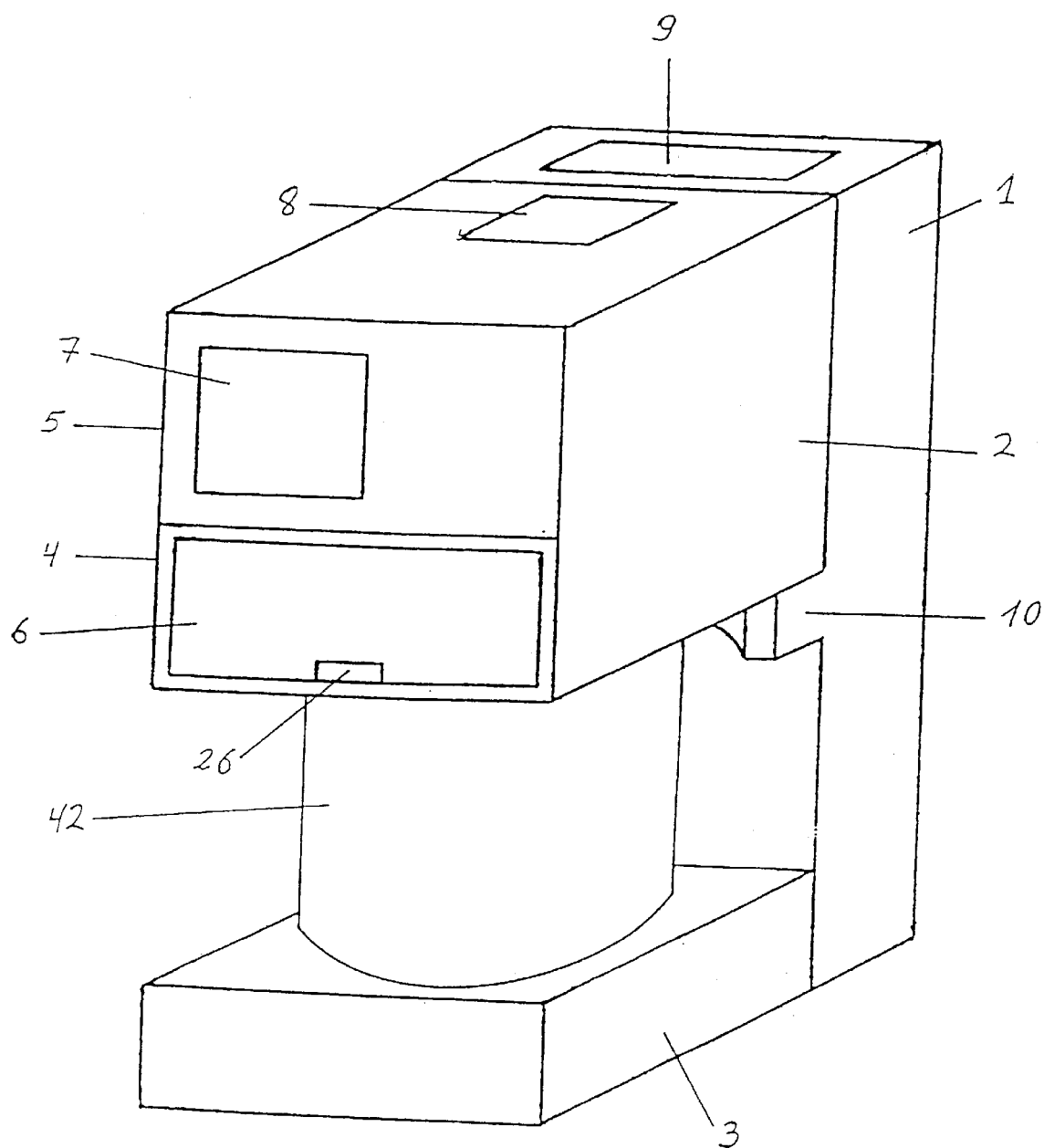

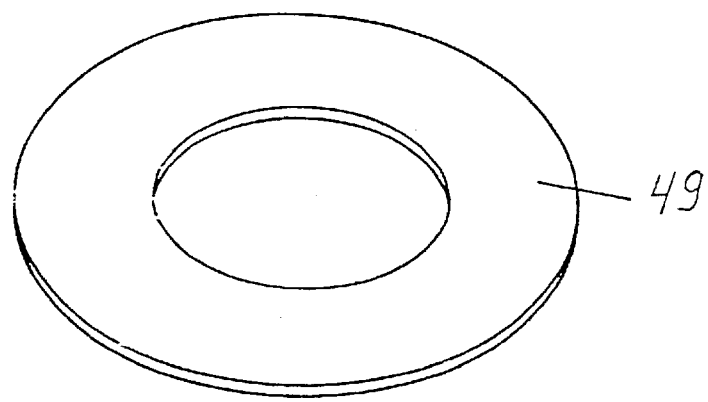
Fig. 9
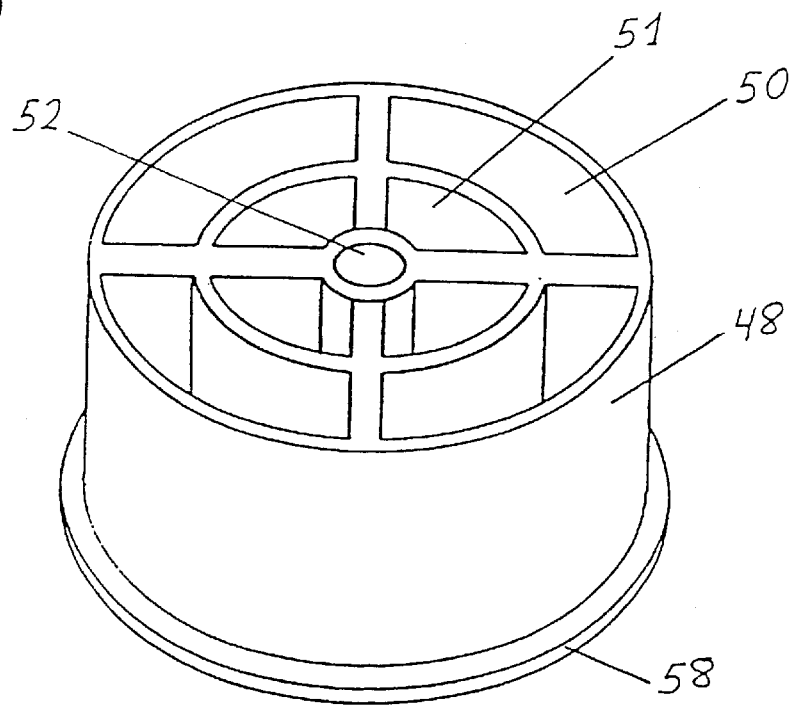
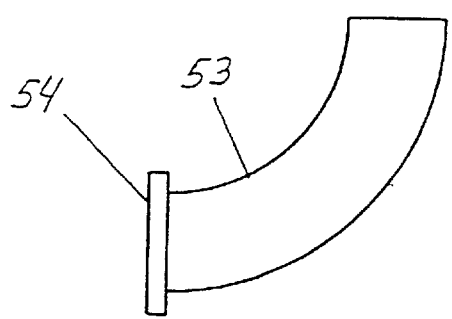

DEVICE FOR AUTOMATICALLY PREPARING FOOD

BACKGROUND OF THE INVENTION

The invention relates to a device for automatically preparing food. It relates in particular to a kitchen appliance for household application.

Household appliances, such as microwave ovens and the like, are known by means of which instant dishes can be heated. However, such appliances do not allow a dish of fresh ingredients to be automatically prepared. For preparing dishes of a plurality of fresh ingredients a person needs to e.g. mix the ingredients and cook them as long as necessary according to the different cooking period, and the like.

BRIEF SUMMARY OF THE INVENTION

It is an object of the invention to provide a device for automatically preparing food, which also allows food to be prepared from a plurality of different ingredients.

The device according to the invention for automatically preparing food comprises a hot plate for heating a pot. According to the invention a chamber for accommodating an exchangeable cartridge is provided above the hot plate. The cartridge contains the ingredients for preparing the food. The cartridge is provided with an opening for filling the ingredients into the pot, the opening being closed with a closure. According to the invention the closure is actuated by a drive unit provided at the chamber. The drive unit preferably is an electric drive unit such that opening of the cartridge may be carried out automatically. For preparing a dish the exchangeable cartridge needs simply to be placed into the device and preparation of the food started. After the start of the food preparation the opening in the cartridge is automatically opened by the drive unit at a predetermined time. The opening process takes place e.g. when the pot has been heated to a predetermined temperature. Since the cartridge is an exchangeable cartridge, different dishes can be prepared in a simple manner by placing a cartridge filled with the ingredients for the corresponding dish into the device. The cartridges can e.g. be purchases in the form of filled non-returnable cartridges.

Preferably, the drive unit comprises at least one tear-open element by means of which a foil closing the cartridge can be torn open. This offers the advantage that the cartridge can be of simple configuration and is merely closed by a foil. This is particularly advantageous when non-returnable cartridges are used.

Preferably, the chamber bottom contains an opening provided with a closure. The closure is also adapted to be actuated by the drive unit. At the closure an opener, e.g. a tear-open element, for opening the closure of the foil of the cartridge may be provided. The closure in the chamber bottom serves for closing the chamber and further opening the cartridge when the closure is actuated. Provision of a chamber closure allows the chamber to be configured as a cooling chamber. In the cooling chamber a cartridge containing perishable ingredients can be accommodated.

The drive unit preferably comprises an spindle connectable with the closure provided in the chamber bottom. By rotating or displacing the spindle the closure is actuated and thus the chamber bottom opened. In particular when the chamber is configured as a cooling chamber, the drive unit is arranged above the cooling chamber. To allow unimpeded removal and insertion of the cartridge out of and into the chamber, the spindle of the drive unit is of displaceable configuration. To actuate the chamber closure the spindle is moved through the chamber and engages with the chamber closure. Arrangement of the drive unit above the chamber allows the chamber to be directly located above the pot.

To allow preparation of dishes where e.g. different ingredients must be filled into the pot at different times, or when different ingredients cannot be stored in a common department, the cartridge preferably comprises a plurality of compartments for different ingredients. The cartridge is configured such that the individual compartments can be automatically arranged by a positioning means above the opening in the chamber bottom. This can be effected e.g. by automatically displacing the cartridge. Preferably, the cartridge has a circular-cylindrical cross-section. The compartments then have a circular and/or circular segmental cross-section. Arrangement of the individual compartments above the opening in the chamber bottom is effected by rotating the cartridge.

Instead of tearing open a foil closing the cartridge the cooking appliance according to the invention may comprise a plunger adapted to be automatically actuated. With the aid of the plunger the closure of the cartridge is pierced. Preferably, the closure is pierced from above such that the plunger first pierces a lid of the corresponding compartment and then a bottom portion of the same compartment. Preferably, some of the compartments provided in the cartridge are opened by a plunger and some of the compartments are opened with the aid of the openers provided in the closure of the chamber bottom.

For mixing the dishes filled into the pot a mixer may further be provided in the pot. The mixer is connectable via an operating spindle with a drive unit. By means of the drive unit the mixer can be moved into different directions at different speeds. The drive unit is preferably arranged above the chamber to allow the chamber to be located immediately above the pot. The operating spindle can be moved through the chamber for the purpose of connecting it with the mixer. The operating spindle is e.g. a telescopic spindle. To allow the operating spindle to be moved through the chamber and the cartridge located in the chamber, the cartridge is provided with a corresponding recess.

The pot is preferably closed with a lid having an opening opposite an opening in the cooling chamber bottom. Thus the ingredients from the cartridge are fed through the opening in the chamber bottom and then through the opening in the lid into the pot.

Preferably, the opening in the potlid can be closed by a projection provided at the mixer. Closing of the potlid is effected by rotating the mixer into a position in which the projection is arranged immediately below the opening in the lid. To allow tight closing of the opening in the lid, the mixer can be lifted such that the projection bears against the inside of the lid. Thus it is possible that the ingredients are cooked in the pot even at overpressure.

Preferably, the device comprises a stand carrying the chamber. Further, the various drive units are fastened to the stand and, possibly, the hot plate is arranged thereon. Preferably, the stand further comprises a vapour discharge duct. Through the vapour discharge duct vapour escaping through the opening in the lid is discharged. With the vapour discharge duct a vapour filter or a vapour escape may be connected. Thus the vapour occurring during preparation of food does not enter the room. To prevent vapour from entering the room, at least one vapour guide plate may be additionally provided at the potlid and/or on the chamber bottom. The vapour guide plate directs the vapour leaving the pot towards the vapour discharge duct.

Further, a water connection for supplying water via the opening in the lid into the pot may be provided at the stand. In this connection, the vapour guide plates may serve for supplying the water into the opening in the lid. Further, the stand may comprise a water discharge. The water discharge serves for discharging cleaning water. For cleaning purposes water is supplied from the water connection to the area between the opening in the lid and the chamber bottom. When the opening in the lid is closed, the water cannot enter the pot but exclusively serves for cleaning the chamber bottom and the closure of the potlid. After the cleaning process the cleaning water automatically flows off via a water discharge. In this connection, the vapour guide plates may serve for preventing the water from flowing out of the device.

The cooking appliance according to the invention may further be provided with a meat roaster insertable into the pot and adapted for roasting meat or other dishes. The meat roaster is an independent invention. The meat roaster comprises a roaster bottom divided into a plurality of sections by fins arranged essentially perpendicular to the roaster bottom. Further, a meat turning means is provided. For this purpose a correspondingly configured mixer having essentially vertical legs is provided. By rotating the meat turning means, the meat is pressed against the fins of the roaster bottom by the legs of the meat turning means. Thereby one side of the meat is lifted and turned such that it is turned over into the adjacent area. Thus the meat roaster with the meat turning means is an automatic device for turning over meat or other dishes to be roasted.

To remove the meat after the roasting process from the hot plate, the meat turning means is provided with projections. The projections mesh with recesses of the meat roaster. For lifting the meat roaster, the roaster comprises guide elements cooperating with guide elements arranged on the inner wall of the pot. By rotating the meat roaster, the roaster is lifted along the guide elements. Preferably, the rail ends are configured as supports on which rests a supporting element for holding the meat roaster in its lifted position.

When the meat roaster is lifted, it is possible to prepare a gravy or another dish in the pot. For this purpose recesses are provided in the roaster bottom through which the legs of the meat turning means can be moved into the lower pot area. By rotating the meat turning means thus acting as a mixer dishes can be mixed in the lower pot area. The preparation of dishes in the lower pot area can be effected by supplying ingredients contained in the cartridge, as described above.

The cartridge for supplying ingredients to the cooking appliance described above comprises a plurality of compartments for different ingredients. The bottoms of the individual compartments are closed with a foil. Preferably, this is a body with a circular-cylindrical cross-section comprising circular and/or ring-segmental compartments. Preferably, the foils closing the individual compartments are provided with a projection. With this projection the opener of the closure of the chamber bottom engages for the purpose of opening the corresponding compartment. This facilitates the opening of the individual compartments. Preferably, a recess is assigned to at least one compartment of the cartridge, in which recess the foil is accommodated when the compartment is opened. The foil is thus moved into the recess when the compartment is opened. This prevents an already opened foil from affecting the rotation or displacement of the cartridge.

For rotating a circular-cylindrical cartridge a drive means, in particular an endless toothed ring, is preferably provided at the cartridge. For rotating the cartridge, such that the next cartridge compartment is located above the opening in the chamber bottom, a drive unit comprising a gearwheel can mesh with the endless toothed ring. Further, the cartridge can be rotated via a wheel bearing against the outer wall of the cartridge. In this case rotation is caused by friction. Exact positioning of the cartridge can be effected with the aid of markings on the cartridge and a corresponding sensor.

For controlling the cooking appliance according to the invention a microprocessor is provided. The microprocessor allows e.g. the times, at which certain compartments of the cartridge are opened, to be controlled. Further, the microprocessor may control mixing periods, mixing speed, cooking periods, temperature of the hot plate, supply, time of supply and quantity of water supplied to the pot, and the like.

BRIEF DESCRIPTION OF THE SEVERAL VIEWS OF THE DRAWING(S)

Figure 2:
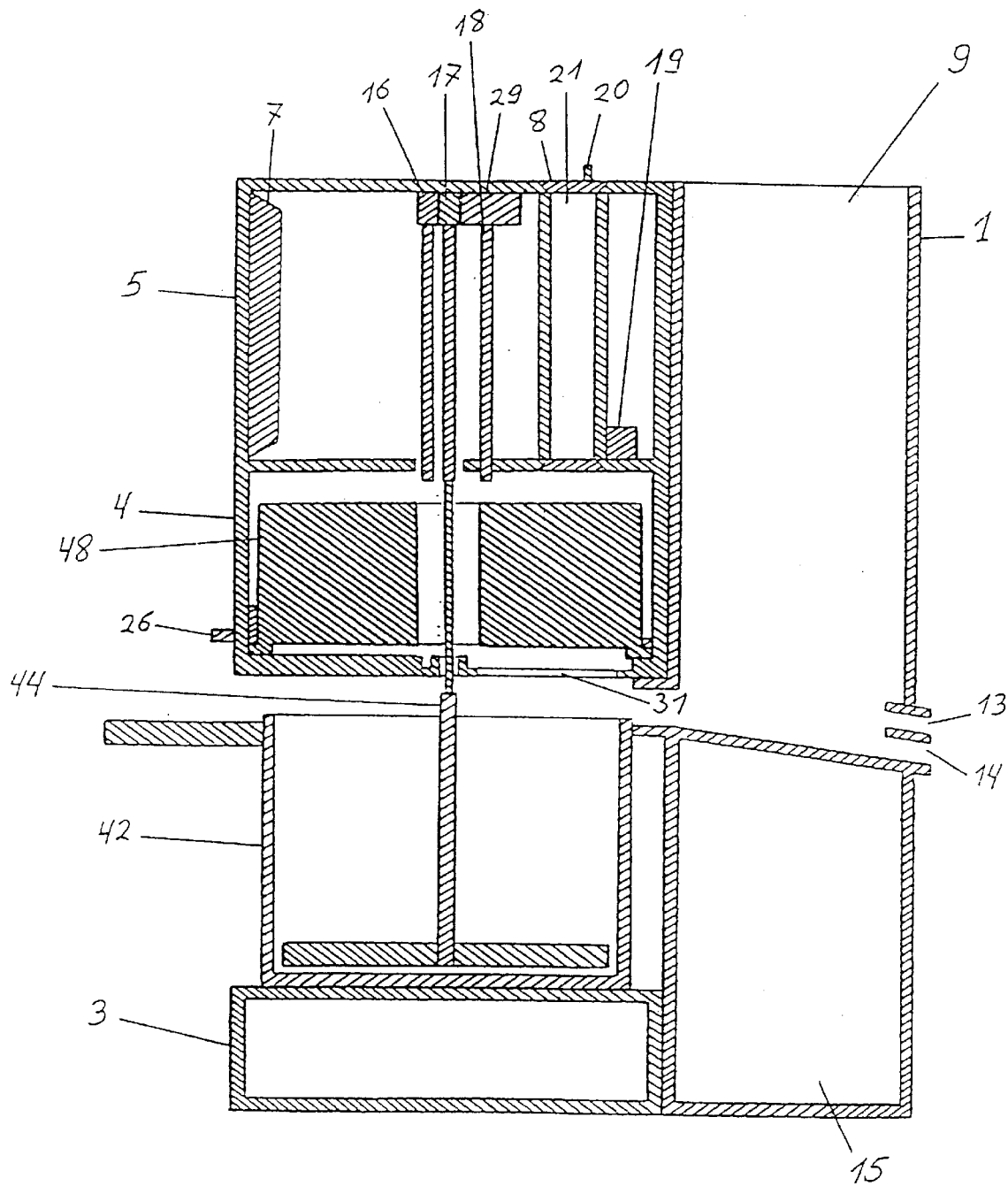
Figure 3:
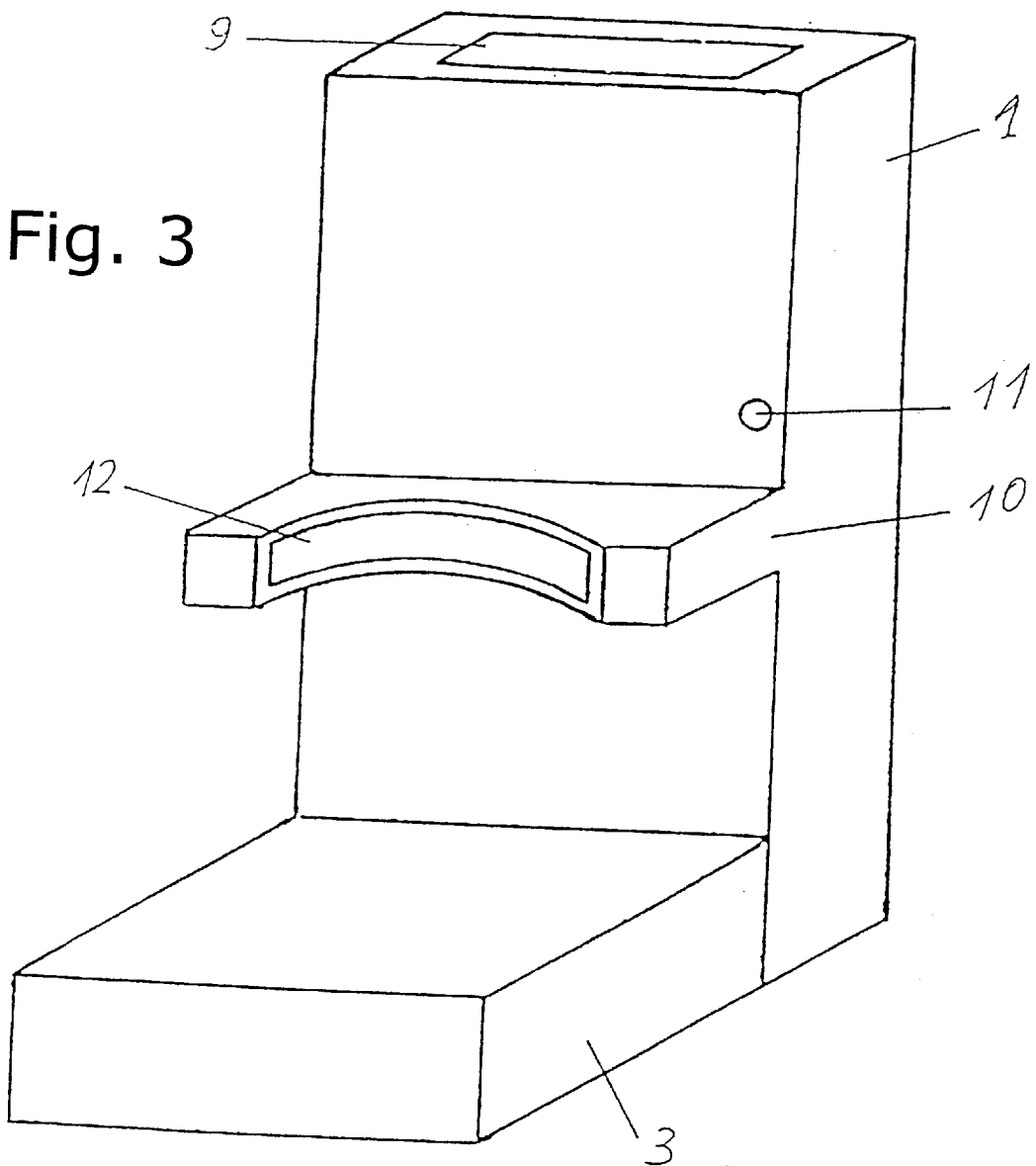
Figure 4:
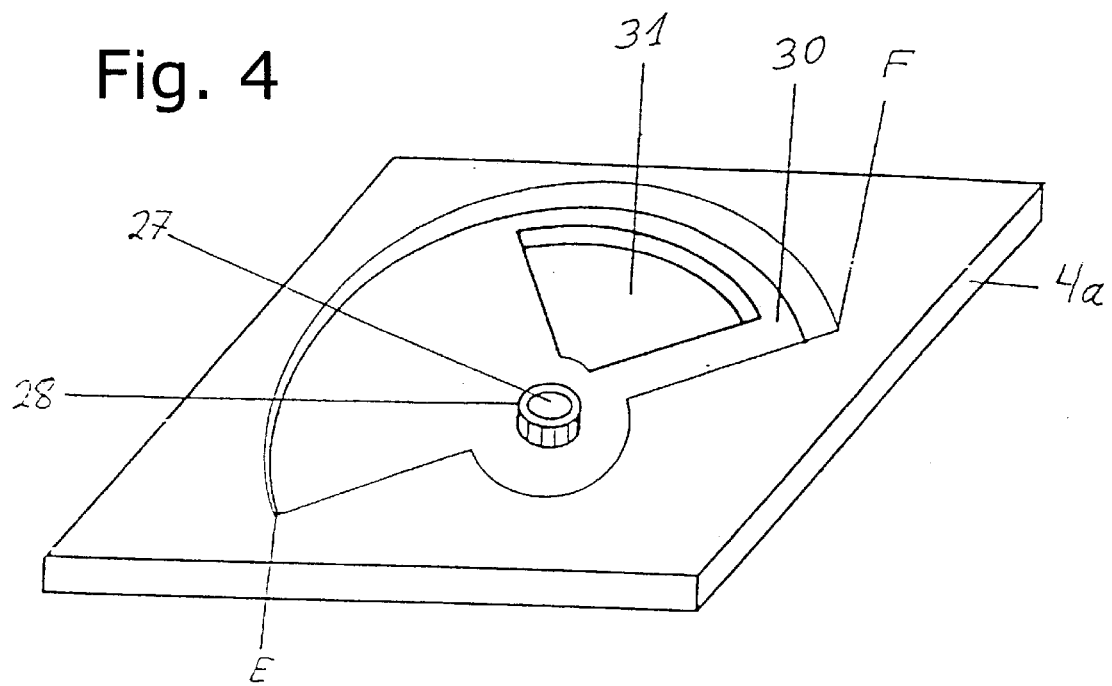
Figure 5:
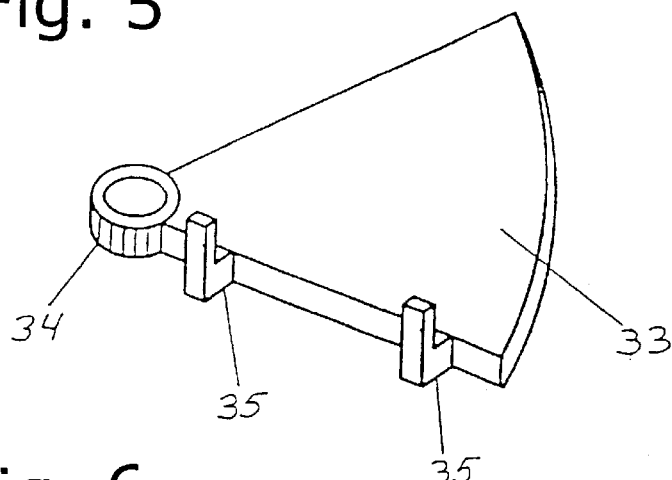
Figure 6:
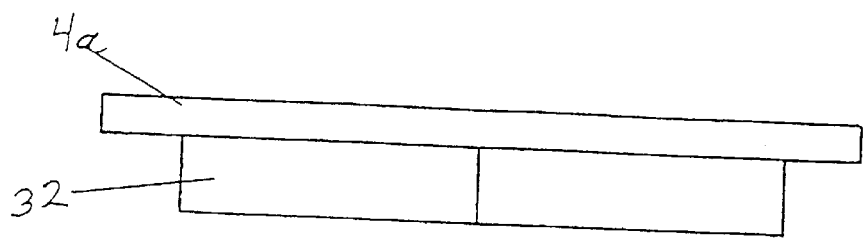
Figure 7:
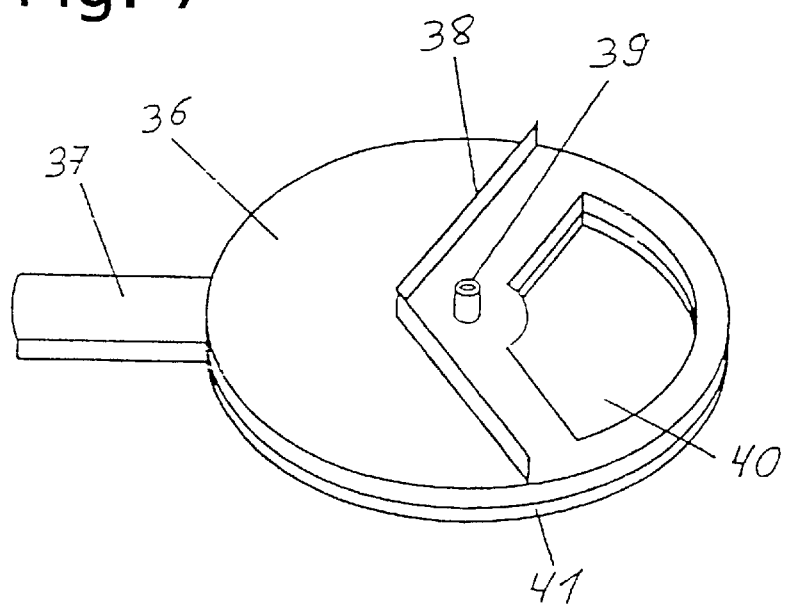
Figure 12:
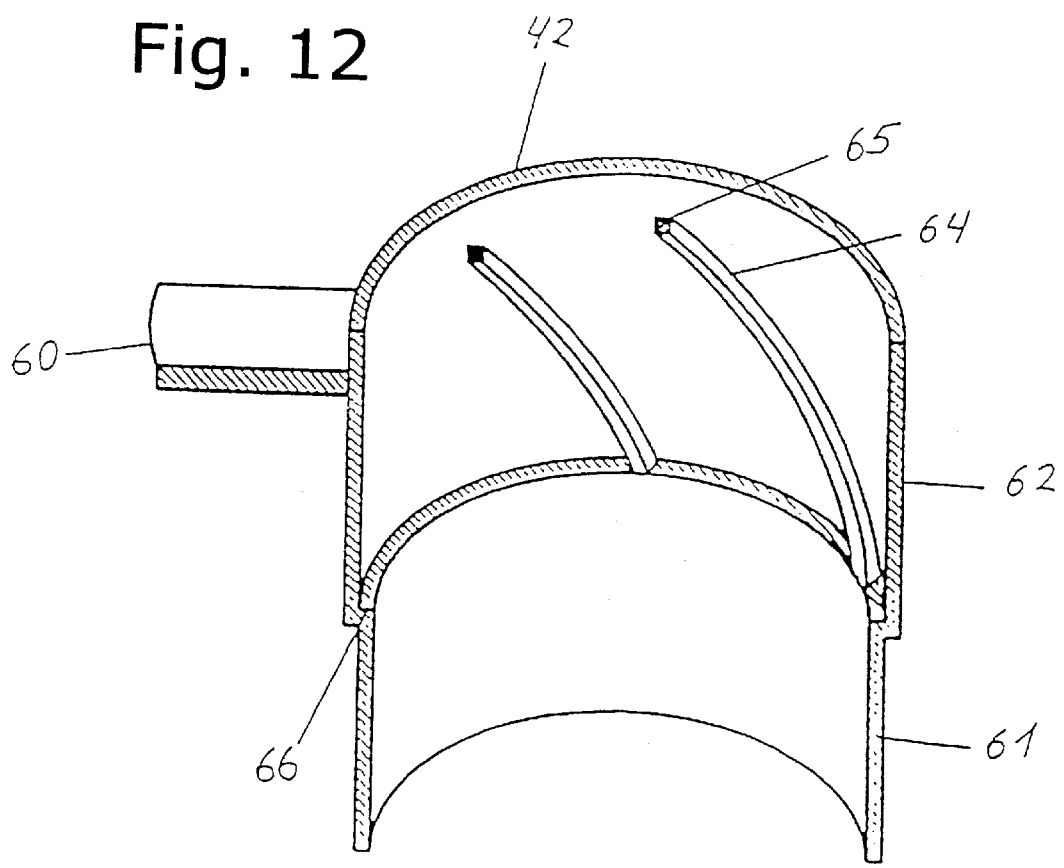
Figure 8:
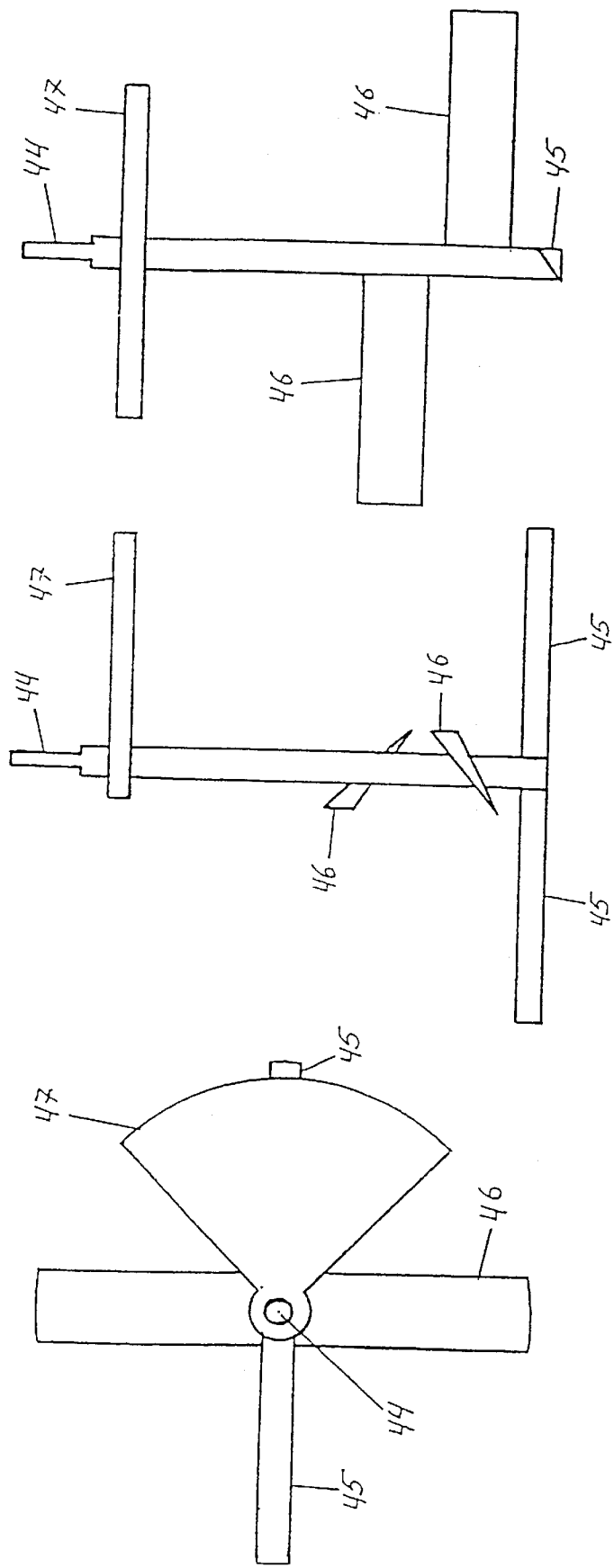
Figure 10:
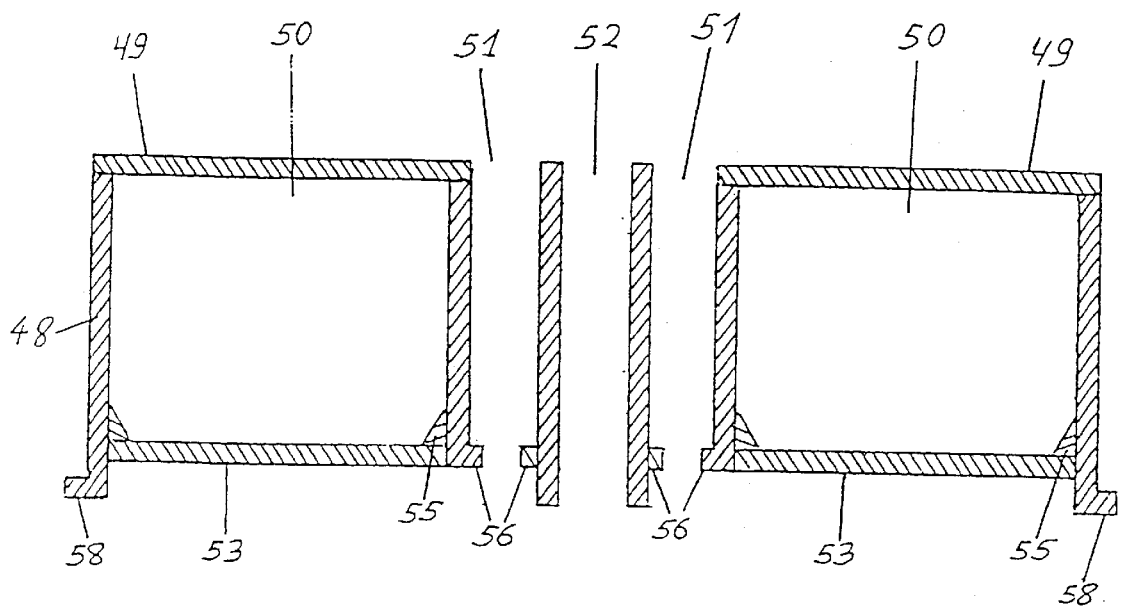
Figure 11:
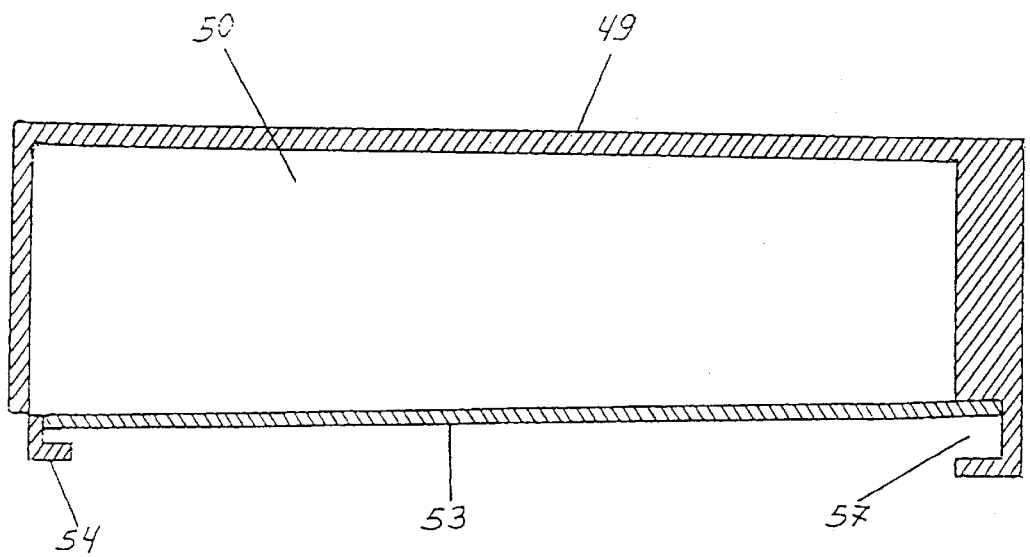
Figure 13A:
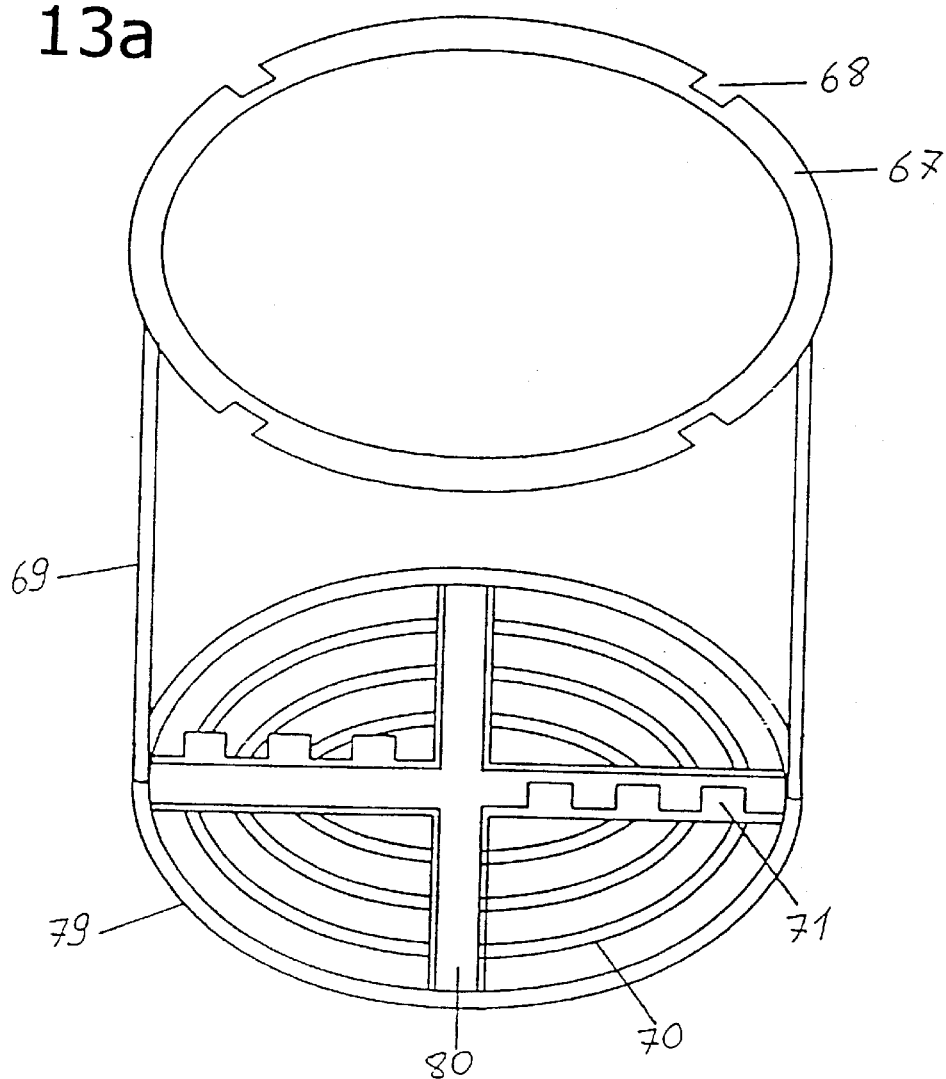
Figure 13B:
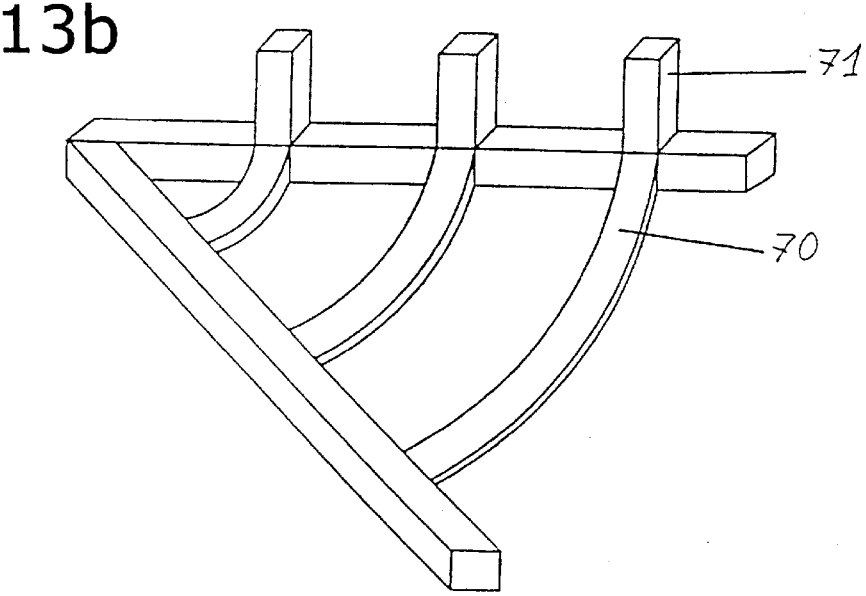
Figure 14A:
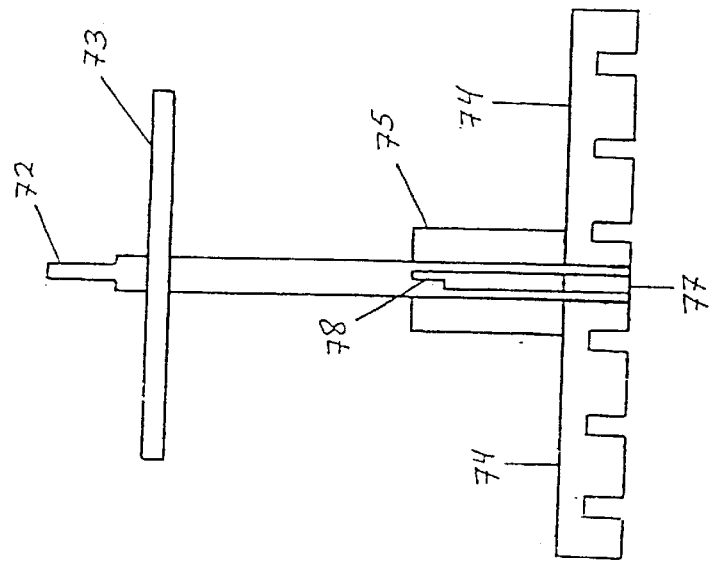
Figure 14B:
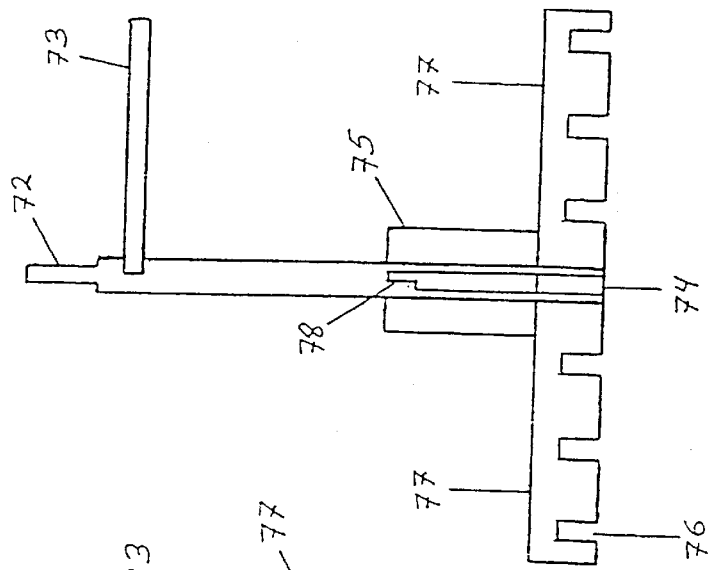
Figure 14C:
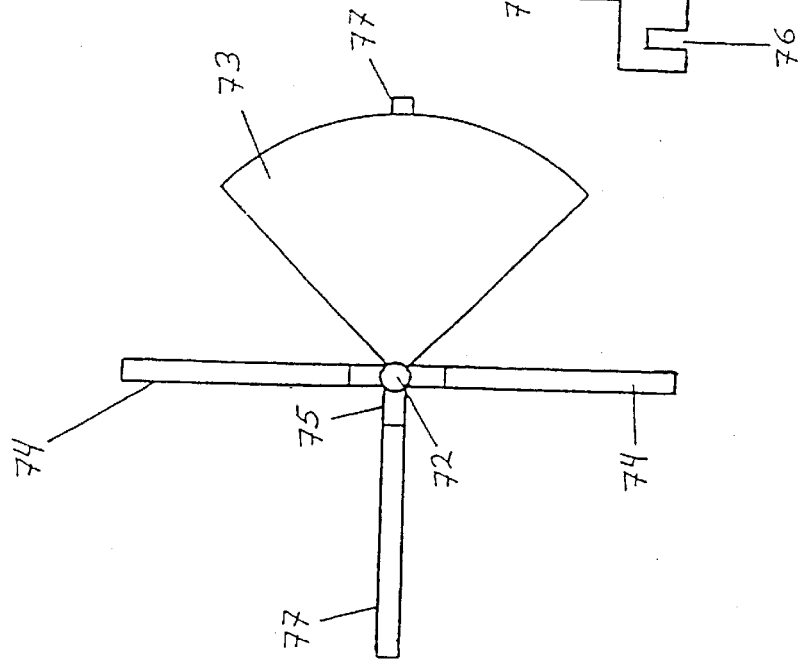
Figure 15:
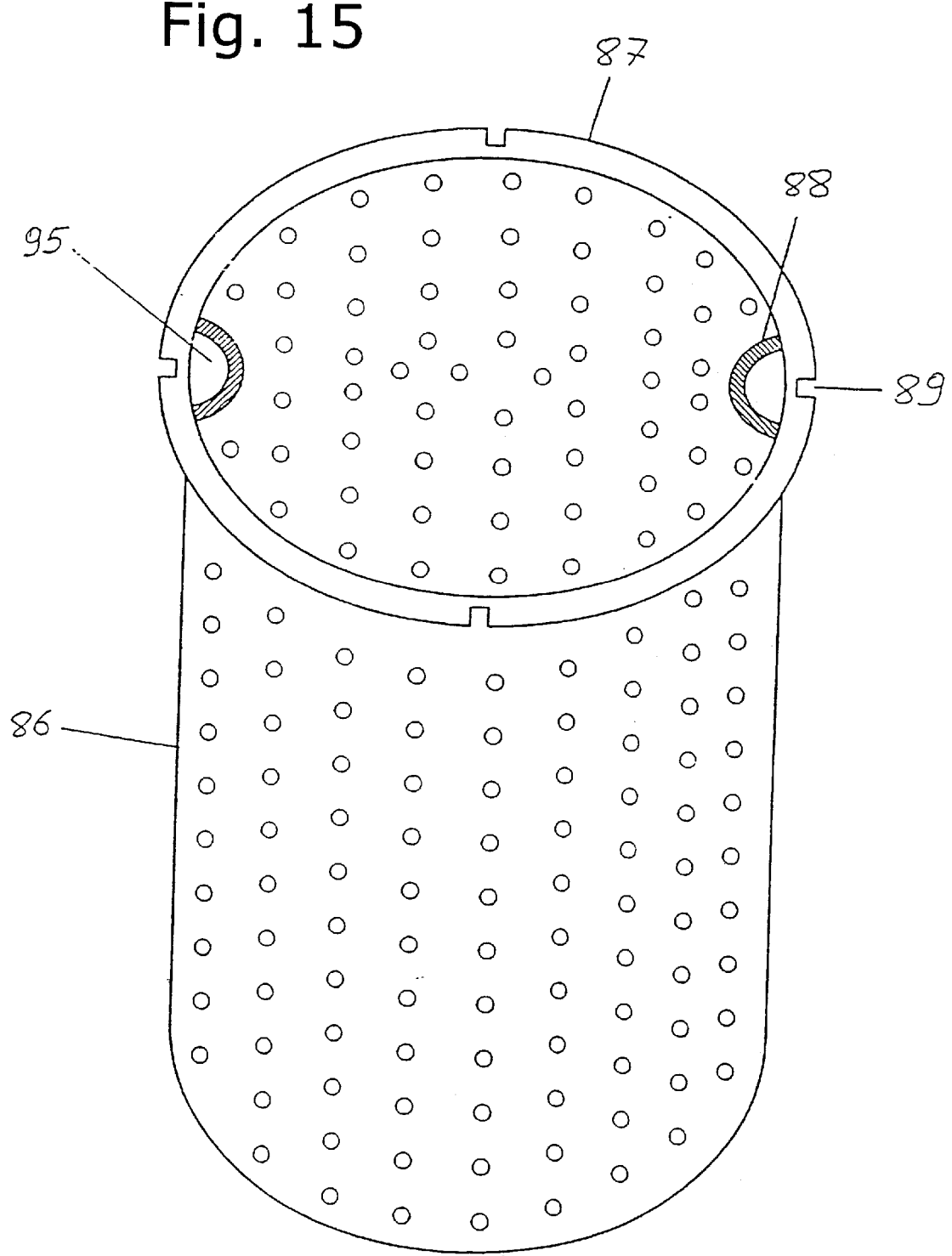
Figure 16:
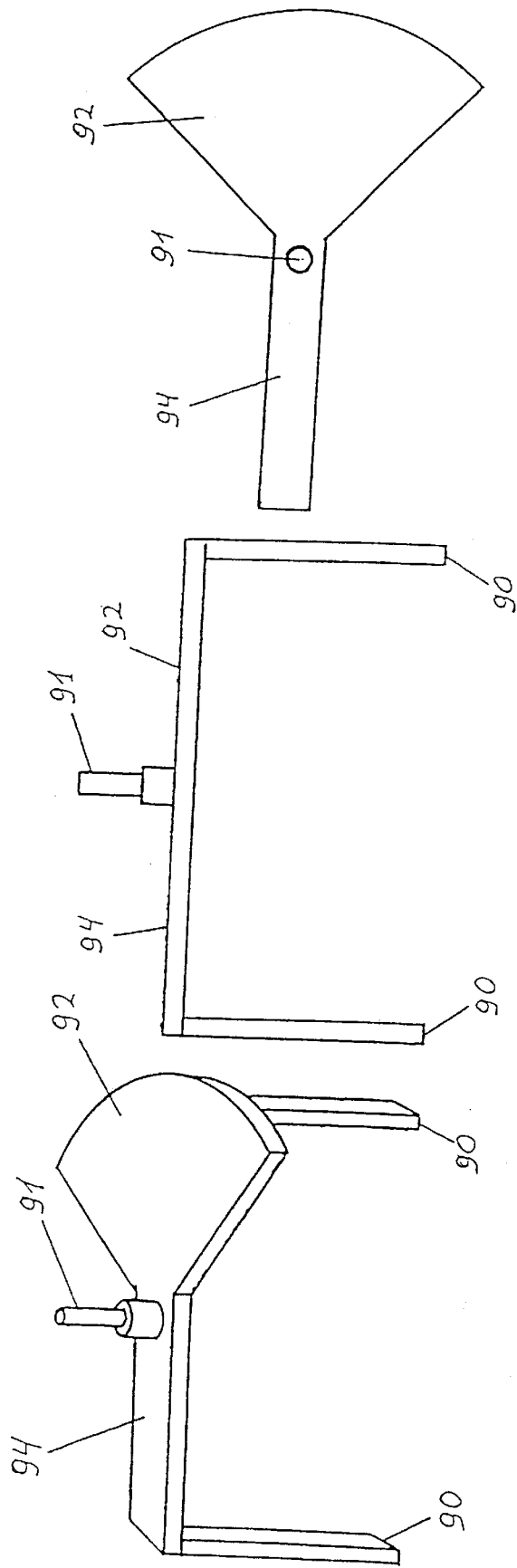

Hereunder preferred emboidments of the invention are described in detail with reference to the appended drawings in which:

| | |
|---|---|
| FIG. 1 | shows a schematic perspective view of the device, |
| FIG. 2 | shows a schematic cross-sectional view of the device, |
| FIG. 3 | shows a schematic perspective view of the stand of the device with the hot plate, |
| FIG. 4 | shows the cooling chamber bottom, |
| FIG. 5 | shows the closure provided in the cooling chamber bottom, |
| FIG. 6 | shows a schematic front view of the cooling chamber bottom, |
| FIG. 7 | shows a schematic perspective view of the potlid, |
| FIG. 8 | shows a first embodiment of the mixer, |
| FIG. 9 | shows a schematic explosion view of the cartridge, |
| FIG. 10 | shows a schematic cross-sectional view of the cartridge, |
| FIG. 11 | shows a schematic cross-sectional view of a cartridge compartment, |
| FIG. 12 | shows a schematic cross-sectional view of the pot, |
| FIG. 13a | shows a schematic perspective view of the meat roaster, |
| FIG. 13b | shows an enlarged view of a segment of the roaster bottom, |
| Figs. 14 a–c | show a schematic top view and side views of the meat turning means, |
| FIG. 15 | shows a strainer insertable into the pot, and |
| FIG. 16 | shows an agitator cooperating with the strainer. |

DETAILED DESCRIPTION OF THE INVENTION

The cooking device comprises a stand 1 which carries a box 2. In the box 2 the cooling chamber 4 and an operating chamber 5 are provided. Further, the box 2 carries the microprocessor 7 for controlling the device. Below the cooling chamber 4 the pot 42 is arranged on a hot plate 3. For preparing a dish a cartridge 48 is placed into the cooling chamber 4. For this purpose the box comprises a flap 6 with a grip portion 26. Then the type of dish is entered in an operating field of the microprocessor 7 such that the microprocessor 7 executes the corresponding program for preparing the dish.

In the pot 42 a mixer 44 for mixing the dishes filled from the cartridge 48 into the pot 42 is arranged. The mixer 44 is rotatable via an operating spindle 17 provided with a drive unit. The operating spindle 17 is a telescopic spindle arranged in the operating chamber 5. For connecting the operating spindle 17 with the mixer 44 the operating spindle 17 is displaced, i.e. extended in a telescopic manner. This process is effected automatically.

For supplying elongate farinaceous products, such as spaghetti and the like, a container 21 is arranged in the operating chamber 5. The container 21 is closed by a lid 8 comprising a gripping portion 20. The farinaceous products can be stored in the container 21 prior to the preparation of the dish. For filling the farinaceous products from the container 21 into the pot 42 a lid provided in the intermediate wall between the cooling chamber 4 and the operating chamber 5 is opened. The lid is adapted to be actuated by an electric motor 19. When the farinaceous products are supplied, either no cartridge 48 is contained in the cooling chamber 4, or the cartridge 48 comprises a passage opening which is in alignment with the container 21 such that the farinaceous products fall from the container 21 into the pot 42.

In the stand 1 a cooling motor 15 is arranged which is connected via cooling lines with the cooling chamber 4. Further, a vapour discharge duct 9 is provided in the stand 1, via which vapour discharge duct 9 the vapour leaving the pot 42 can be discharged. For this purpose e.g. a suction means, such as a fan, can be provided in the vapour discharge duct. The vapour discharge duct 9 can be connected with a vapour escape such that no smells occur in the room in which the device is located.

The stand 1 further comprises a water supply connection 13. The water supply connection 13 can be directly connected with the water pipe. Via the water supply connection 13 water can be supplied via the lower area of the vapour discharge duct 9 towards the pot 42. Further, a water discharge 14 is provided in the stand. Via the water discharge excess water or cleaning water can be discharged.

The cooling chamber bottom 4a (FIG. 4) comprises a semicircular recess 30. In the recess 30 a circular-segmental opening 31 is provided. Through the opening 31 the ingredients are supplied from the cartridge 48 into the pot 42. For opening and closing the opening 31 a closure (FIG. 5) rotatable about the ring 28 is provided. For automatically opening and closing the opening 31 by rotating the closure 33 the drive unit 16 comprising a vertically displaceable operating spindle is provided (FIG. 2). For actuating the closure 33 the operating spindle shown in FIG. 2 is displaced downwards. The operating spindle may also be a telescopic spindle. The lower end of the spindle meshes with teeth 34 provided at the closure 33. By rotating the drive spindle the closure 33 is rotated about the ring 28. When the closure 33 is in the position designated by "E" (FIG. 4), the opening 31 is open. In the position designated by "F" the closure 33 is located above the opening 31 and closes the latter.

In the ring 28 a circular passage opening 27 is provided through which may pass the operating spindle 17 (FIG. 2) which operates the mixer 44. On the lower side of the cooling chamber bottom 4a vapour guide plates 32 are provided. The vapour guide plates 32 direct the vapour leaving the pot 42 (FIG. 2) towards the vapour discharge duct 9.

The pot 42 is closed with a lid 36 (FIG. 7). The lid 36 comprises a grip portion 37. The lid 36 comprises a circular-segmental opening 40 located opposite the opening 31 in the chamber bottom 4a (FIG. 4). The ingredients are thus supplied from the cartridge 48 through the opening 31 of the chamber bottom 4a and then through the opening 40 of the lid 36 into the pot 42. Further, the lid 36 is provided with a central opening 39 which is in alignment with the opening 27 in the chamber bottom 4a (FIG. 4). Through the opening 39 the operating spindle for driving the mixer 44 is moved into the pot 42 by automatically coupling the operating spindle with the mixer.

On the upper side of the lid vapour guide plates 38 are provided which are arranged opposite the vapour guide plates 32 on the lower side of the chamber bottom 4a (FIG. 6). The vapour guide plates 32,38 are plastic fins arranged in the form of a Vee. By provision of vapour guide plates 32 and 38 arranged opposite each other the area between the lid 36 and the chamber bottom 4a is tightly closed such that vapour leaving the pot 42 is always directed towards the vapour discharge duct 9. On the circumference of the circular lid 36 a rubber sealing 41 is provided which ensures that the lid 36 sealingly closes the pot 42.

The mixer 44 (FIG. 8) comprises, on a vertical fin in the lower area, horizontally arranged mixing rods 45 for mixing the dishes. The rods 45 are arranged near the bottom of the pot 42, which prevents the dish from burning. Four rods 45 arranged at right angles to each other are provided. Above the rods 45 further mixing rods 46 are located on the central rod of the mixer 44. The mixing rods 46 mix the ingredients in the pot 42. At the upper end of the mixer 44 a projection 47 is provided which is of circular-segmental shape as seen from above. The projection 47 is somewhat larger than the opening 40 (FIG. 7) in the lid. When the mixer 44 is in a position in which the projection 47 is arranged beneath the opening 40 in the lid, the projection 47 serves for closing the opening 40 in the lid. To ensure tight closing of the opening, the mixer can be slightly lifted such that the upper side of the projection 47 sealingly bears against the lower side of the lid 36.

The cartridge 48 located in the cooling chamber 4 is exchangeable through the flap 6 (FIG. 1) in the box 2. The cartridge 48 has a circular ring-shaped cross-section. This cross-section is divided by partition walls into a plurality of compartments 50,51. The inner compartments 51 are of circular-segmental shape and the outer compartments 50 are of ring-segmental shape. In the individual compartments 50,51 various ingredients for the dish to be prepared can be accommodated. This is preferably effected by an automatic process such that the ready-filled cartridges 48 can e.g. be purchased in the supermarket. The cartridge 48 is closed with a lid 49. The bottoms of the outer compartments 50 are closed with a foil 53. For fastening the foil 53 to the cartridge, widened portions 55 are provided in the lower area of the compartments 50, to which widened portions 55 the foil 53 is e.g. glued. The foil 53 is preferably an aluminium foil which serves for shielding the ingredients from the heat developed in the pot 42. Each individual foil 53 is provided with projection 54 (FIG. 11). The projection 54 serves for opening the compartment 50 by removing the foil 53. This process is also effected automatically. For this purpose the closure 33 (FIG. 5) arranged in the chamber bottom 4a is provided with openers 35. By rotating the closure 33, which simultaneously opens the opening 33 in the chamber bottom 4a, the openers 35 engage with the projection 54 and move the foil 53 towards a recess 57 in the cartridge 48. During the opening process the foil 53 is pushed into the recess 57.

The upper and lower areas of the inner compartments 51 are closed with foils. These foils are opened by a plunger 18 (FIG. 2) by moving the plunger 18 vertically downwards by means of the hydraulic motor 29 shown in FIG. 2. The inner compartments 51 comprise, in their lower area, projections 56 which ensure controlled discharge of the ingredients from the inner compartments 51. This is necessary in particular when liquid ingredients are contained in the inner compartments 51.

For leading the operating spindle 17, by means of which the mixer 44 is driven (FIG. 2), through the cartridge, the cartridge 48 comprises a duct 52 extending centrally therethrough.

Since the individual compartments 50,51 can be emptied only when they are positioned above the opening 31 (FIG. 4) in the chamber bottom 4a, the cartridge must be rotated. For this purpose the cartridge comprises a ring 58 with which a corresponding drive unit engages. The ring 58 may e.g. be a toothed ring with which meshes a gearwheel of a drive unit. The individual compartments 50,51 are emptied in time intervals relative to each other. Thereby the ingredients can be supplied from the compartments 50,51 to the pot 42 at the exact times required for the preparation of the dishes.

With the aid of a meat roaster meat or other dishes can be roasted in the pot 42. For this purpose the meat roaster comprises a roaster bottom 79 which is divided into sections 70 by a plurality of fins 71 which are arranged essentially perpendicular to the roaster bottom 79. In the embodiment shown each section 70 constitutes a quarter of the entire circular roaster bottom 79. Between the individual sections 70 recesses 80 are provided. The recess 80 is thus of cross-shaped configuration. The individual bars of the roaster bottom 79 are held together by an outer ring of the roaster bottom 79 and the fins 71. The roaster bottom 79 is connected via two fins arranged perpendicular to the roaster bottom 79 with a ring 67 extending parallel to the roaster bottom. The flat ring 67 comprises four openings 68 evenly distributed over the circumference.

The fins 71 may extend either over the overall radius of the roaster bottom 79 or consist of individual teeth.

For turning the meat lying on a section 70 of the roaster bottom 79 a meat turning means (FIGS. 14a–14c is provided. The meat turning means 72 comprises, at its upper end, a connection, e.g. a square, connectable with the operating spindle 17 for rotating the meat turning means 72. To the lower end of the meat turning means 72 horizontal legs 74,77 are fastened. For turning the meat the legs 74,77 are arranged at a small distance to the roaster bottom 79 such that they do not contact the roaster bottom 79.

By rotating the meat turning means 72 meat lying on the section 70 is pressed by the leg 74 or 77 against a leg 71 defining the section 70. Thus the meat is lifted at the leg 74 or 77 and turned over the fin 71 by further rotation of the meat turning means 72. The meat is thus moved in a turned state into a neighboring section 70.

The legs 74,77 comprise recesses 76 corresponding with the teeth 71. The distance of the recesses 76 to the outer edge of the legs 74 is larger than the distance of the recess 76 to the outer edge 77. Thereby the meat turning means can be returned into an initial position before meat is placed onto the individual roaster bottom sections 70. The meat turning means can thus be rotated opposite to the direction of rotation for turning purposes until the legs adjoin the teeth 71 of the roaster bottom.

When the meat has been roasted on both sides, the meat roaster is lifted. For this purpose rails 64 (FIG. 12) acting as guide elements engage in the openings 68 of the rings 67 also acting as guide elements. The rails 64 are arranged on the inner wall of the pot 42 in the upper area of the pot. The rails are bent rails arranged at a slant. By rotating the meat turning means the meat roaster moves along the rails 64 in upward direction since free rotation of the meat roaster is prevented by the cooperation of the rails 64 with the openings 68. Rotation of the roaster is effected by the meat turning means 72. For this purpose the meat turning means 72 is displaced downwards towards the roaster bottom 79 such that the legs 74,77 enter the recesses 80.

Projections 75 of the meat turning means 72 provided in the leg plane cause the meat roaster to be rotated. Since the meat roaster moves upwards owing to the rotation, the projections 75 are located at a higher position than the legs 74,77. This ensures rotation of the roaster even if the roaster has already been lifted from the bottom and is located above the legs 74,77.

When the roaster has reached the end of the rails 64 the rails 64 do no longer engage in the openings 68. The roaster is further rotated by certain extent such that the openings 68 are no longer located above the ends of the rails 64. The rail ends serve as a support 65 upon which rests the ring 67 of the meat roaster. In this position the roaster bottom 79 is lifted relative to the pot bottom.

Like the mixer shown in FIG. 8, the meat turning means 72 comprises a projection 73 for closing the opening 40 in the lid (FIG. 7).

Further, a strainer 86 (FIG. 15) can be inserted into the pot 42. In the strainer 86 dishes can e. g. be boiled in water. The strainer 86 comprises a ring 87 configured for suspending the strainer in the pot 42. On the ring 87 semicircular projections 88 protruding inwards are fastened. The projections 88 are arranged opposite each other, each forming an opening 95. A mixer 91 can engage in the opening 95 (FIG. 16). For this purpose the mixer comprises two essentially vertical legs 90 connected with the mixer 91 via transverse fins 92, 94. The mixer 91 can be driven via the operating spindle 17 (FIG. 2). By turning the strainer 86 to and fro the e.g. farinacous products in the strainer are stirred. The transverse fin 92 of the mixer 91 is configured as a circularsegmental projection, as in the case of the mixers shown in FIGS. 8 and 14, by means of which the opening 40 in the lid 36 (FIG. 7) can be closed.

What is claimed is:

1. A device for automatically preparing food, comprising a hot plate for heating a pot,
   a chamber arranged above the hot plate for receiving an exchangeable cartridge containing the ingredients for the preparation of food, and
   a first opening provided in the cartridge, the first opening being positioned in the cartridge above the pot for filling the ingredients into the pot, wherein the first opening is adapted to be closed with a first closure which can be actuated by a drive unit provided at the chamber.

2. The device according to claim 1, wherein the drive unit comprises at least one tear-open element for tearing open the first closure.

3. The device according to claim 1, further comprising a cooling chamber bottom having a second opening comprising a second closure, said second closure being adapted to be actuated by the drive unit and said second opening being positioned below said first opening.

4. The device according to claim 3, further comprising an opener at the second closure, said opener being capable of opening the first closure.

5. The device according to claim 1, wherein the drive unit is arranged above the chamber and comprises a displaceable drive shaft which is shiftable through the chamber for the purpose of actuating the second closure.

6. The device according to claim 3, wherein the cartridge comprises a plurality of compartments for different ingredients, said compartments being adapted to be automatically arranged above the second opening in the cooling chamber bottom by a positioning means.

7. The device according to claim 1, further comprising a plunger adapted to be automatically actuated for opening the compartments in the cartridge.

8. The device according to claim 1, further comprising a mixer disposed in the pot, the mixer being connectable via an operating spindle with the drive unit.

9. The device according to claim 1, further comprising a stand carrying the chamber, the stand comprising a vapour discharge duct.

10. The device according to claim 9, further comprising vapour guide plates for guiding vapour towards the vapour discharge duct.

11. The device according to claim 10, further comprising a water connection for supplying water via a third opening in a lid into the pot.

12. The device according to claim 1, wherein a meat roaster for roasting meat is insertable in the pot, the meat roaster comprising a roaster bottom divided into a plurality of sections by fins arranged essentially vertical to the roaster bottom, and a mixer configured as a meat turning means comprising horizontal legs, wherein, by rotation of the meat turning means, the meat is pressed by the legs against the fins of the roaster bottom and is turned over the fins into the neighboring section.

13. The device according to claim 12, wherein the meat turning means comprises projections for rotating the meat roaster, the projections mesh with recesses of the meat roaster, and wherein the meat roaster is provided with first guide elements cooperating with second guide elements provided on the inner wall of the pot, wherein the meat roaster is lifted, by the rotation, along the second guide elements.

14. A cartridge for supplying ingredients to a device that automatically prepares food, comprising a body (48) comprising a plurality of compartments (50,51) for different ingredients, each of said compartments having a compartment bottom, and foils (53) closing the compartment bottoms of the individual compartments (50,51).

15. Cartridge according to claim 14, characterized in that the body (48) has a circular-cylindrical cross-section, and the compartments (50,51) are of circular and/or ring-segmental configuration.

16. The cartridge according to claim 14, wherein the foils (53) are provided with a projection (54) that cooperates with an opener (35) of a closure (33) of said device for the purpose of opening the corresponding compartment (50,51).

17. The cartridge according to claim 14, wherein a recess (57), which receives the foil (53) when the compartment (50) is opened, is assigned to at least one compartment (50).

* * * * *